(12) United States Patent
Widgery (10) Patent No.: US 8,939,635 B2
(45) Date of Patent: Jan. 27, 2015

(54) WATERPROOF WARNING WHIP BASE AND CONNECTOR

(71) Applicant: Checkers Industrial Products, LLC, Broomfield, CO (US)

(72) Inventor: Greg Widgery, Westminster, CO (US)

(73) Assignee: Checkers Industrial Products, LLC, Broomfield, CO (US)

( * ) Notice: Subject to any disclaimer, the term of this patent is extended or adjusted under 35 U.S.C. 154(b) by 213 days.

(21) Appl. No.: 13/797,312

(22) Filed: Mar. 12, 2013

(65) Prior Publication Data

US 2014/0085910 A1    Mar. 27, 2014

Related U.S. Application Data

(60) Provisional application No. 61/704,292, filed on Sep. 21, 2012.

(51) Int. Cl.
| | |
|---|---|
| H01R 33/00 | (2006.01) |
| F21V 23/06 | (2006.01) |
| H01R 13/52 | (2006.01) |
| H01R 43/26 | (2006.01) |
| B63B 45/02 | (2006.01) |
| B60Q 1/26 | (2006.01) |

(52) U.S. Cl.
CPC ............... *F21V 23/06* (2013.01); *H01R 13/52* (2013.01); *H01R 43/26* (2013.01); *H01R 13/5202* (2013.01); *B63B 45/02* (2013.01); *B60Q 1/2661* (2013.01)
USPC .............. 362/647; 362/382; 439/271; 29/857

(58) Field of Classification Search
USPC ...................... 362/647, 382; 439/271; 29/857
See application file for complete search history.

(56) References Cited

U.S. PATENT DOCUMENTS

| | | | | |
|---|---|---|---|---|
| 3,671,972 A | * | 6/1972 | Spilsbury et al. | ............. 343/750 |
| 5,031,827 A | * | 7/1991 | von Braunhut | ................... 231/3 |

* cited by examiner

*Primary Examiner* — Joseph L Williams
(74) *Attorney, Agent, or Firm* — Holland & Hart (57) ABSTRACT

A warning whip assembly includes an elongate whip, a light, wiring, a base, and an electrical connector assembly. The elongate whip has first and second ends. The light is mounted to the first end of the warning whip. The wiring extends from the light to the second end of the warning whip. The base is connected to the second end of the warning whip. The electrical connector assembly includes a first connector portion connected to the base with a waterproof connection. The wiring is connected to the first connector portion. The electrical connector assembly also includes a second connector portion that is releasably connected to the first connector portion.

20 Claims, 9 Drawing Sheets

WATERPROOF WARNING WHIP BASE AND CONNECTOR

RELATED APPLICATION

This claims the benefit of U.S. Provisional Application No. 61/704,292, filed 21 Sep. 2012, which is hereby incorporated by reference herein in its entirety.

BACKGROUND

The use of warning whips to increase visibility of vehicles is well known. A warning whip includes an elongate rod that extends vertically upward from a vehicle. A free end of the rod may include a visual enhancement feature such as a flag or light. An opposite end of the whip is connected to the vehicle with a mounting bracket. The whip may include a connector feature for securing the whip to the mounting bracket. The connection feature may include a connector base having a cavity sized to receive an end of the elongate rod, a hex feature formed on an exterior at one end of the base, and a plurality of threads formed at an outer surface at an opposite end of the base. The threaded portion extends through a mounting aperture of the bracket and a threaded nut is attached to the base to secure the whip to the mounting bracket.

In whip designs that include a light or other powered device, wiring for the whip extends through the base. It is common for the wiring to short within the base due to, for example, the limited space within the base to house excess wiring as well as the end of the rod. Shorting may also occur due to egress of water into the base, which may interact with the wiring to cause a short in the electrical system.

Opportunities exist for improving connector features of a warning whip.

SUMMARY

As will be described in greater detail below, one aspect of the present disclosure relates to a warning whip assembly that includes an elongate whip, a light, wiring, a base, and an electrical connector assembly. The elongate whip has first and second ends. The light is mounted to the first end of the warning whip. The wiring extends from the light to the second end of the warning whip. The base is connected to the second end of the warning whip. The electrical connector assembly includes a first connector portion connected to the base with a waterproof connection. The wiring is connected to the first connector portion. The electrical connector assembly also includes a second connector portion that is releasably connected to the first connector portion.

The base may include a stepped cavity having a first cavity portion sized to receive the warning whip and a second cavity portion sized to receive the first connector portion. The base may include a plurality of internal grooves, and the first connector portion is retained in the base using a bonding agent that fills the plurality of internal grooves. The stepped cavity may include a third cavity portion sized to receive excess portions of the wiring. The base may include a hexagonal shaped portion on an outer surface thereof at a first end of the base, and a plurality of threads on the outer surface at a second end of the base. The first connector portion may include a female RCA connector and the second connector portion comprises a male RCA connector. An interface between the base and second connector portion may be waterproof.

Another aspect of the present disclosure relates to a warning whip component that includes a base and an electrical connector assembly. The base includes at least first and second cavity portions, wherein the first cavity portion is open at a first end of the base and sized to receive a proximal end of a whip, and the second cavity portion is open at a second end of the base. The electrical connector assembly includes a female connector inserted into the first cavity portion and having a waterproof connection with the base. The female connector is configured to connect to wiring extending through the whip. The electrical connector assembly also includes a male connector having a waterproof construction and being releasably connected to the female connector.

The first and second cavity portions may have different internal diameters. The first cavity portion may include a wiring space positioned between the female connector and the first cavity portion, the wiring space being configured to house at least some of the wiring. The second cavity portion may include a plurality of grooves formed therein, wherein the plurality of grooves are receptive of a bonding agent used to connect the female connector to the base. The female connector may include a female RCA connector, and the male connector includes a male RCA connector. The male connector may include at least first and second wires connected to the male RCA connector. The male connector may include an overmold encapsulating a connection point between the at least first and second wires and the male RCA connector. The base may have a hexagonal construction on an outer surface at a first end thereof, and a plurality of threads on the outer surface at a second end thereof.

A further aspect of the present disclosure relates to a method of assembling a warning whip component. The method includes providing a base having at least first and second cavity portions arranged axially within the base, the first cavity portion being configured to receive an elongate whip, and an electrical connector assembly including a female connector and a male connector. The method also includes connecting wiring to the female connector, the wiring extending through the whip, inserting the female connector into the second cavity portion with excess wiring collected in the second cavity portion between the female connector and the first cavity portion, and releasably connecting the male connector to the female connector.

The female connector may be connected to the base with a waterproof connection. The second cavity portion may include a wiring space defined between the first cavity portion and the female connector, which is inserted into the second cavity portion. The wiring space receives the excess wiring. The male connector may include a waterproof construction, and the method further includes providing a waterproof connection between the base and the male connector. The method may include providing a plurality of grooves in the second cavity portion, and positioning a bonding agent between the female connector and the base to permanently fix the female connector to the base.

Features from any of the above-mentioned embodiments may be used in combination with one another in accordance with the general principles described herein. These and other embodiments, features and advantages will be more fully understood upon reading the following detailed description in conjunction with the accompanying drawings and claims.

BRIEF DESCRIPTION OF THE DRAWINGS

The accompanying drawings illustrate a number of exemplary embodiments and are a part of the specification. Together with the following description, these drawings demonstrate and explain various principles of the instant disclosure.

Throughout the drawings, identical reference characters and descriptions indicate similar, but not necessarily identical, elements. While the exemplary embodiments described herein are susceptible to various modifications and alternative forms, specific embodiments have been shown by way of example in the drawings and will be described in detail herein. However, one of skill in the art will understand that the exemplary embodiments described herein are not intended to be limited to the particular forms disclosed. Rather, the instant disclosure covers all modifications, equivalents, and alternatives falling within the scope defined by the appended claims.

DETAILED DESCRIPTION OF EXEMPLARY EMBODIMENTS

As will be described in greater detail below, the present disclosure relates generally to warning whips, and more specifically relates to connection systems for mounting warning whips to a vehicle. The present disclosure also relates to electrical connector assemblies used to connect to wiring of a warning whip.

One aspect of the present disclosure relates to a whip connect system that includes a base and a connector assembly. The base includes a first cavity for receiving a free end of a whip (e.g., an elongate rod portion). The base includes a separate cavity for receiving a component of the connector assembly. In one example, the connector assembly includes a female connector and a male connector. At least a portion of the female connector is received in the second cavity of the base at an end of the base opposite the cavity that receives the whip. The female connector is mounted to the base with a waterproof connection. The male connector of the connector assembly has a waterproof construction. When the male connector is mounted to the female connector, the whip connect system may be a waterproof assembly. A waterproof assembly may also be described as having a liquid-tight construction. In one example, an interface between the male connector and the base provides a waterproof interface between the connector assembly and the base.

The base may include three separate cavities, wherein the first cavity receives a free end of the whip, a second cavity receives a portion of the connector assembly (e.g., the female connector), and the third cavity is sized to receive excess wiring. The wiring may extend through the whip to the connector assembly when the connector assembly is removed from the base. After the wiring is connected to the connector assembly, the connector assembly is inserted into the base, and the excess length of wiring collects in the third cavity.

The base may be described as having a single cavity with three separate portions including, for example, a whip portion, a wiring portion, and a connector portion. Each portion of the cavity may have a different size and shape. For example, the whip portion may have a maximum width (e.g., diameter) that is greater than the maximum width of the wiring portion, and the wiring portion may have a maximum width that is greater than that of the connector portion. The cavity of the base may be defined as being a stepped cavity, wherein a step is positioned between each of the whip, wiring and connector portions of the cavity. The wiring portion of the cavity may provide an axial spacing between the whip and connector portions of the cavity. As such, the whip, when inserted in the base, is axially spaced apart from the connector assembly (e.g., a female connector inserted into the connector portion of the cavity).

Providing a space within which excess wiring may collect within a cavity of the base may help reduce the possibility of kinks forming in the wiring and relieve pressure within the excess wiring which may otherwise create shorting of the wiring.

The male connector of the connector assembly may have a waterproof construction. A plurality of wires may be connected to a receiving portion of the male connector using, for example, soldering. The receiving portion, portions of the wires, and the connection point between the wires and the receiving point may be overmolded to form a single, waterproof assembly. Connection features of the male connector may be overmolded with an insulating material to provide the waterproof construction.

When connecting the male connector the female connector after the female connector has been inserted within the base, an interface between the metal connector and the base may be liquid-tight to create a waterproof connection between the base and male connector.

Referring now to FIGS. 1-10, an example whip connect system 16 is shown and described. The whip connect system 16 includes a base 18 and a connector assembly 20. The connector assembly 20 includes a female connector 70 and a male connector 72 (see FIGS. 9 and 10).

The base 18 includes first and second ends 40, 42, a hex portion 44, exterior threads 46, and a cavity 48. The second end 42 may include a proximal end surface 50 of the base 18 (see FIG. 9). The hex portion 44 may be formed on an exterior surface of the base 18 at the first end 40, and the exterior threads 46 may be formed in an exterior surface of the base 18 at the second end 42.

Figure 11:
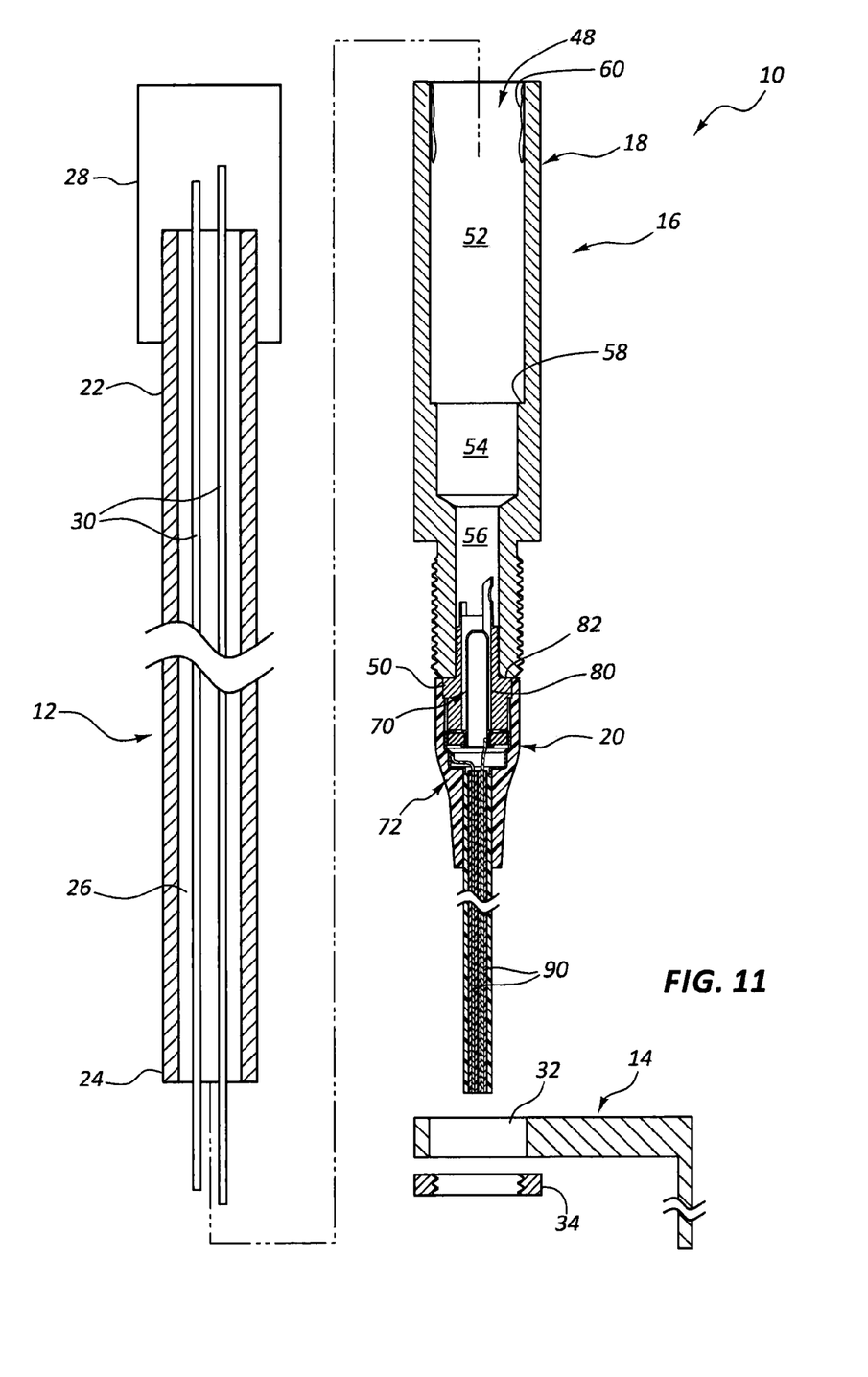
FIG. 11 is an exploded cross-sectional view of a warning whip assembly including the whip connect system of FIG. 1.

The cavity 48 may include a whip portion 52, a wiring portion 54, and a connector portion 56 (see FIG. 11). The whip portion 52 may include a stop surface 58. The stop surface 58 may result from a step feature between the whip portion 52 and wiring portion 54 resulting from a difference in internal diameter or width between the whip portion 52 and wiring portion 54. The whip portion 52 may include a plurality of internal threads or grooves 60. The internal threads 60 may receive a bonding agent such as an adhesive used to help hold a whip within the base 18 as will be described in further detail below.

The wiring portion 54 is sized and configured to receive excess wiring that is connected to the connector assembly 20 and extends through the base 18 into a whip 12 as will be described in further detail below. A connector portion 56 is sized to receive a portion of the connector assembly 20.

Figure 1:
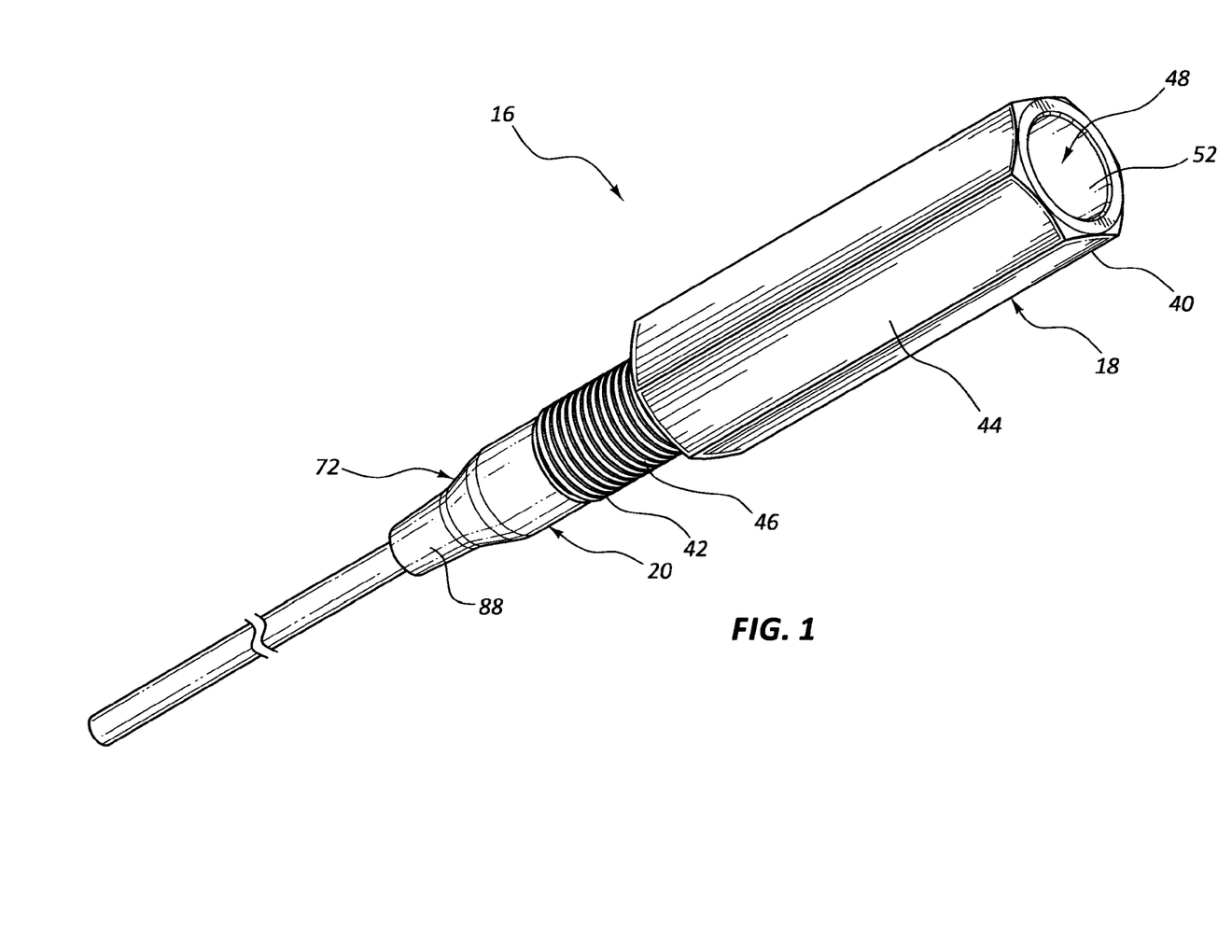
FIG. 1 is a perspective view of an example whip connect system in accordance with the present disclosure.
Figure 2:
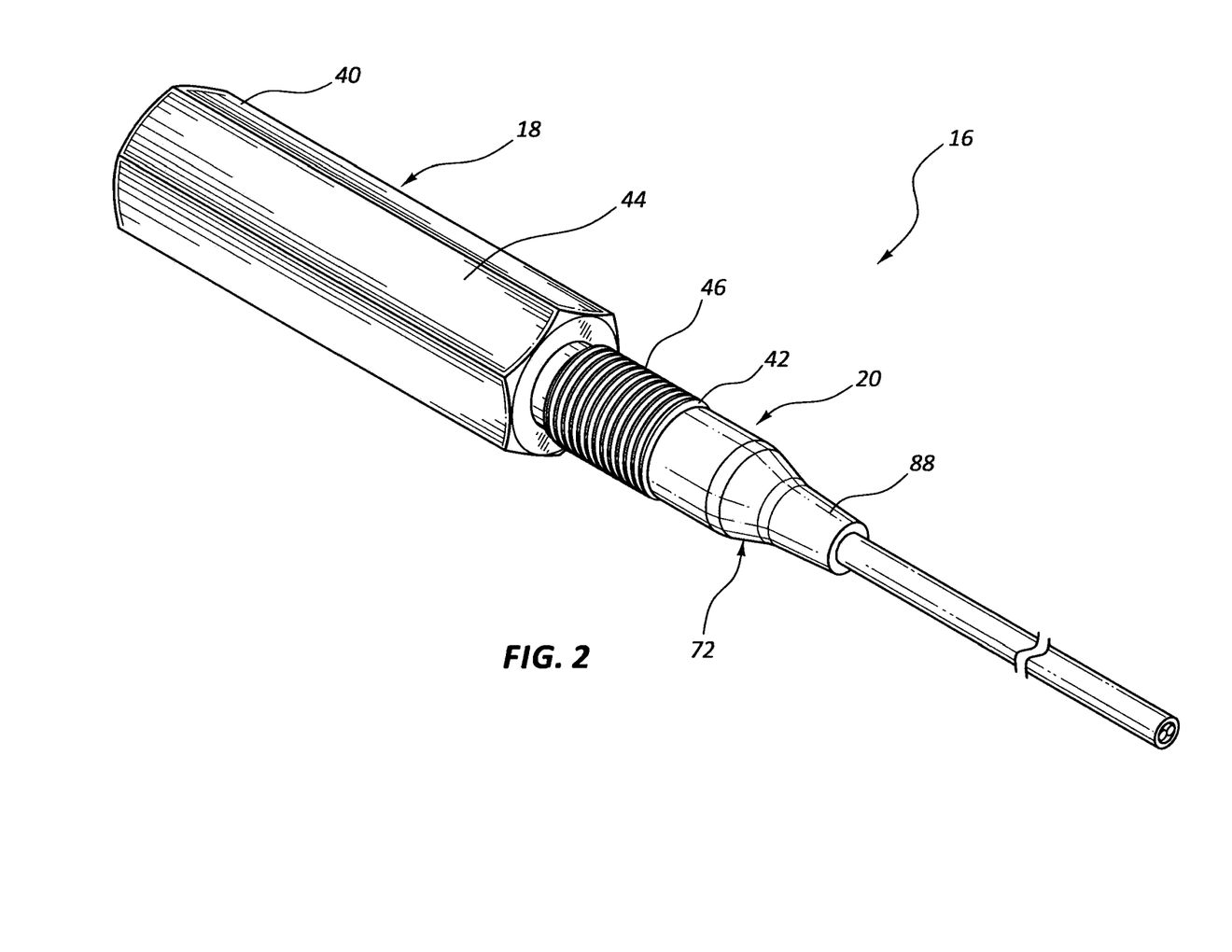
FIG. 2 is another perspective view of the whip connect system of FIG. 1.
Figure 3:
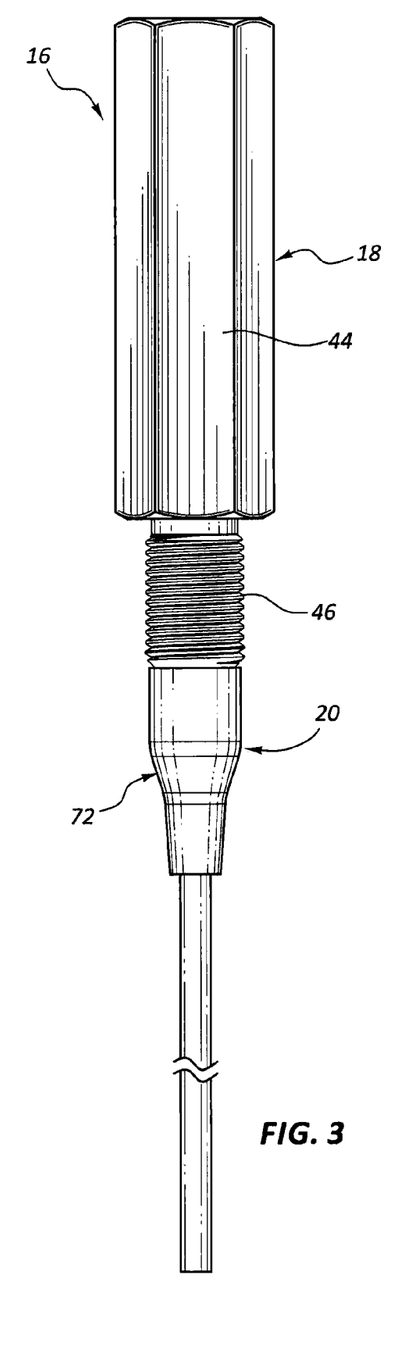
FIG. 3 is a front view of the whip connect system of FIG. 1.
Figure 4:
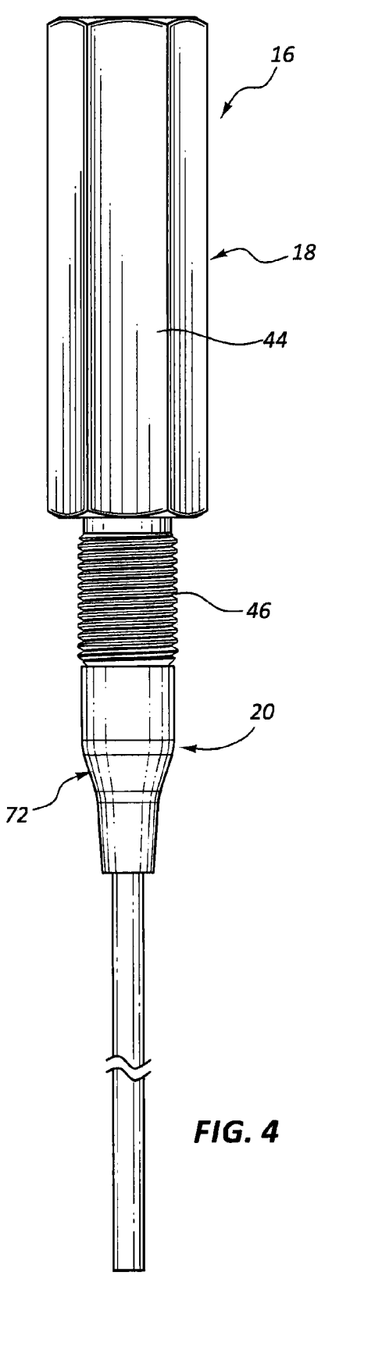
FIG. 4 is a rear view of the whip connect system of FIG. 1.
Figure 5:
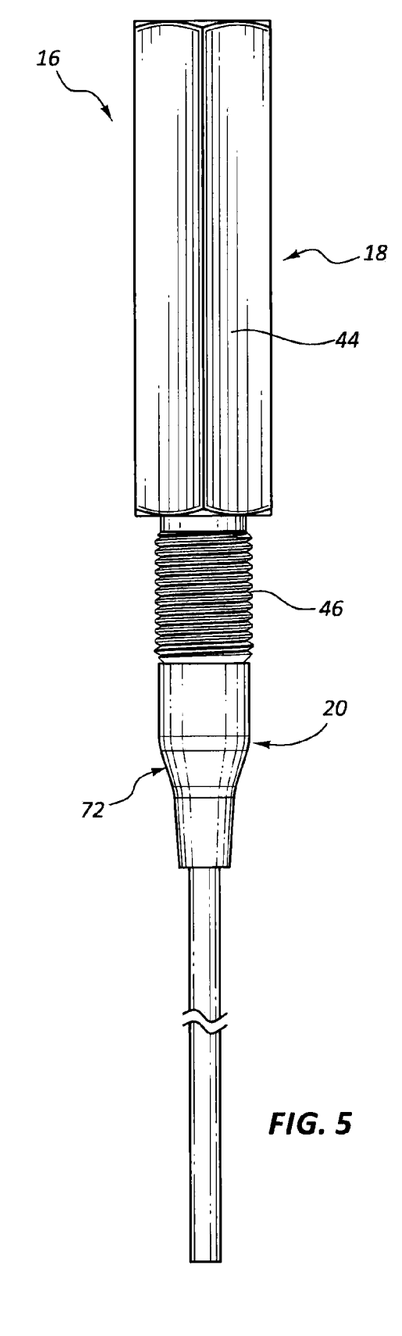
FIG. 5 is a right side view of the whip connect system of FIG. 1.
Figure 6:
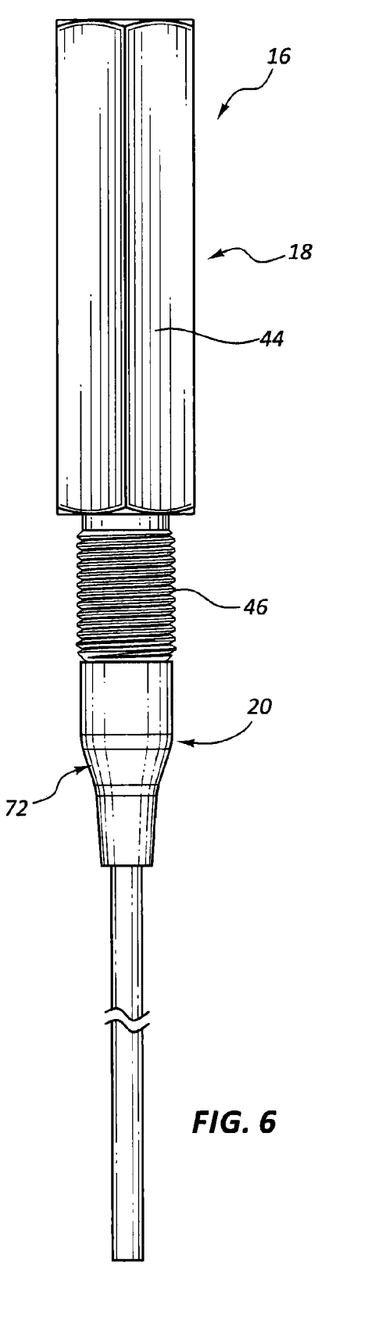
FIG. 6 is a left side view of the whip connect system of FIG. 1.
Figure 7:
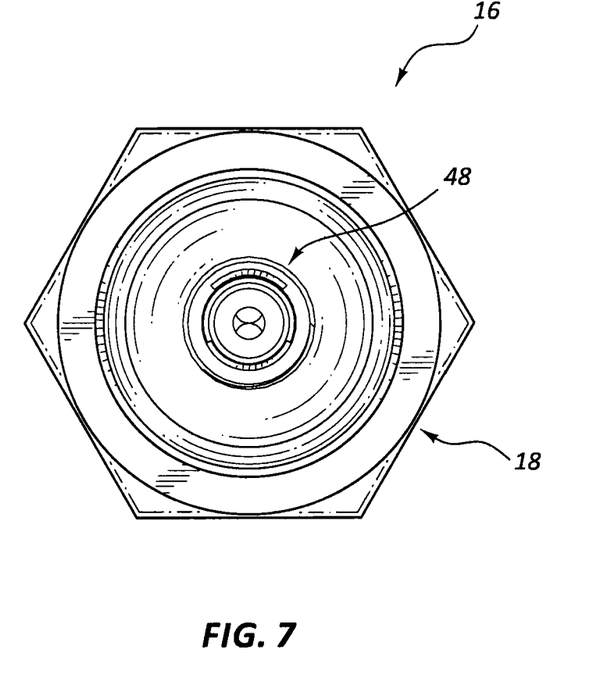
FIG. 7 is a top view of the whip connect system of FIG. 1.
Figure 8:
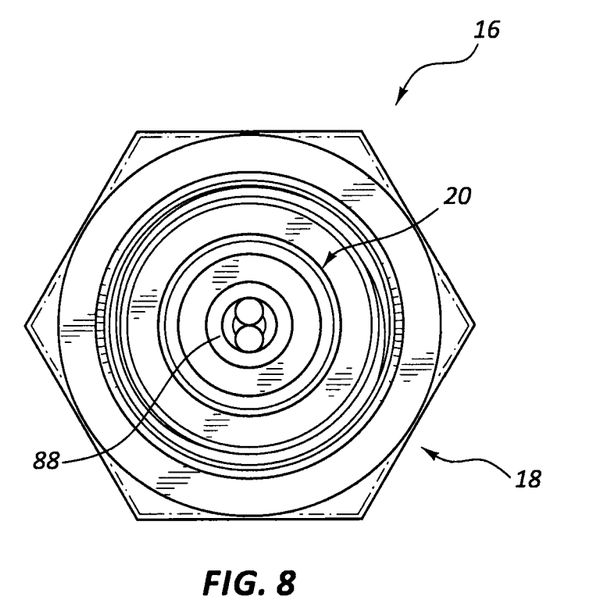
FIG. 8 is a bottom view of the whip connect system of FIG. 1.
Figure 9:
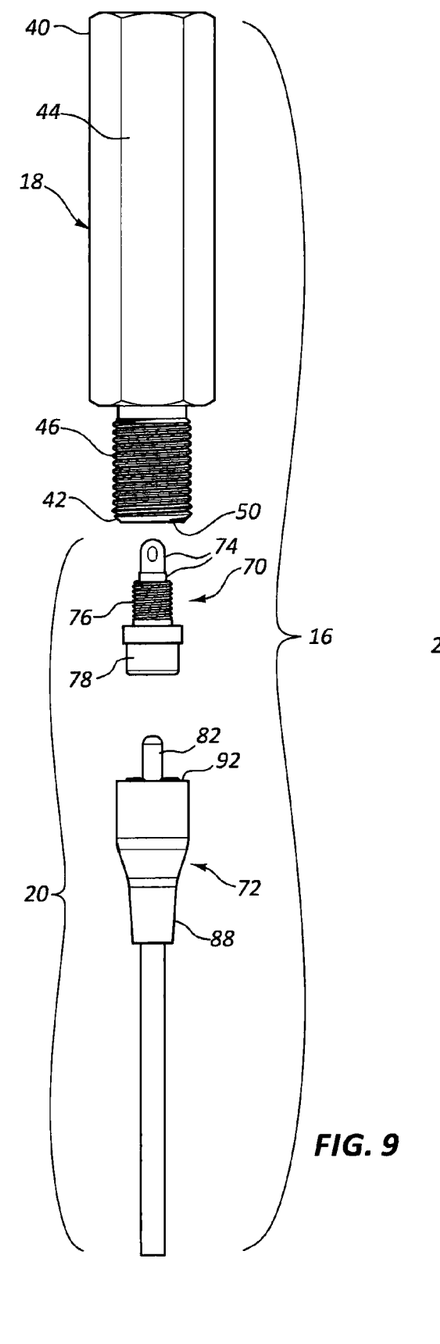
FIG. 9 is an exploded front view of the whip connect system of FIG. 1.
Figure 10:
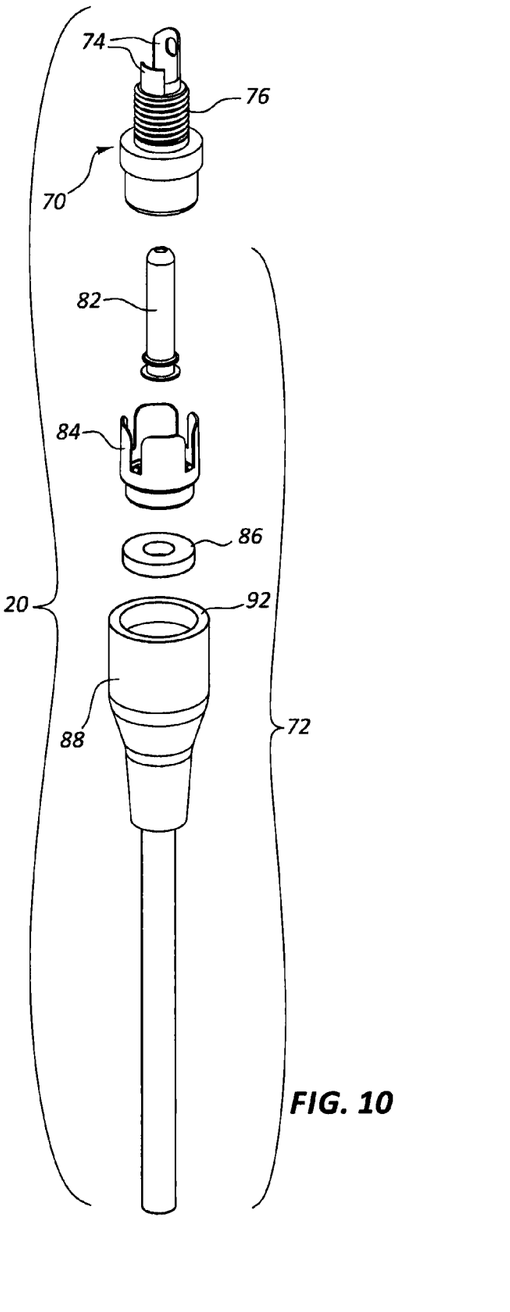
FIG. 10 is an exploded perspective view of a connector assembly of the whip connect system of FIG. 1.

Referring to FIGS. 9 and 10, the female connector 70 of the connector assembly 20 includes wiring connect points 74, external thread 76, and a connector interface 78 having a connector channel 80 (see FIG. 11). The female connector 70 may referred to as a phone jack connector. The wiring connect points 74 may be used to connect wiring that extends through the whip and base 18 to the connector assembly 20. The wiring may be connected to the wiring connect points 74 using, for example, clips, brackets, or soldering. The wiring connect points 74 may be connected to a hot wire and a ground wire. In one example, the longer of the wiring connect points 74, which includes a hole formed therein, is connected to a hot wire and the connector channel 80. The shorter of the wiring connect points 74 may be connected to a ground wire and the outer surface of the connector interface 78.

The external threads 76 may be used to provide a secure connection of the female connector 70 within the connector portion 56 of the base 18. The external threads 76 may create a waterproof connection between the female connector 70 and base 18. Rotating the female connector 70 within the connector portion 56 of the cavity 48 may form threads within the connector portion 56, and may be referred to as "tapping" the connector portion 56 with threads concurrently with connecting the female connector 70 to the base 18.

The connector interface 78 may include an outer surface thereof that provides an interference fit connection with a portion of the male connector 72. The connector channel 80 receives a male portion of the male connector 72. An insulator may be included in the connector interface 78 between the outer surface and a connector channel 80. In at least some arrangements, the female connector 70 is an RCA female connector component. Other types of female connector components may be used. Further, other types of connectors besides female connector components may be used in place of the female connector 70 to provide an electrical connection with wiring extending through the whip and base.

The male connector 72 includes an insertion member 82 (also referred to as a male member 82), a receiving portion 84, a washer 86, and an overmold 88 (see FIGS. 9-11). The insertion member 82 is sized to extend into the connector channel 80 of the female connector 70. The receiving portion 84 is sized to receive the connector interface 78 and may provide an interference fit along an exterior of the connector interface 78 as shown in, for example, FIG. 11. Wiring 90 may be electrically connection to the receiving portions 84 and insertion member 82. The wiring may be connected using, for example, soldering, a connector or a bracket.

The insertion member 82, receiving portion 84, washer 86 and wiring 90, including a connection point between the wiring 90 and receiving portion 84, may be overmolded with an insulating material or other material that provides male connector 72 in a waterproof construction. The overmolding 88 may include a distal end 92, which may contact the proximal end surface 50 of the base 18 to provide a liquid-tight interface therebetween. The distal end 92 may be held in contact with the proximal end surface 50 as shown in FIG. 11 by connect of the insertion member 82 with connector channel 80 and the receiving portion 84 with an exterior surface of the connector interface 78.

The male connector 72 may be configured as an RCA component such as a male portion of an RCA component. The male connector 72 may provide a waterproof connection of the male RCA components to wiring 90.

Figure 12:
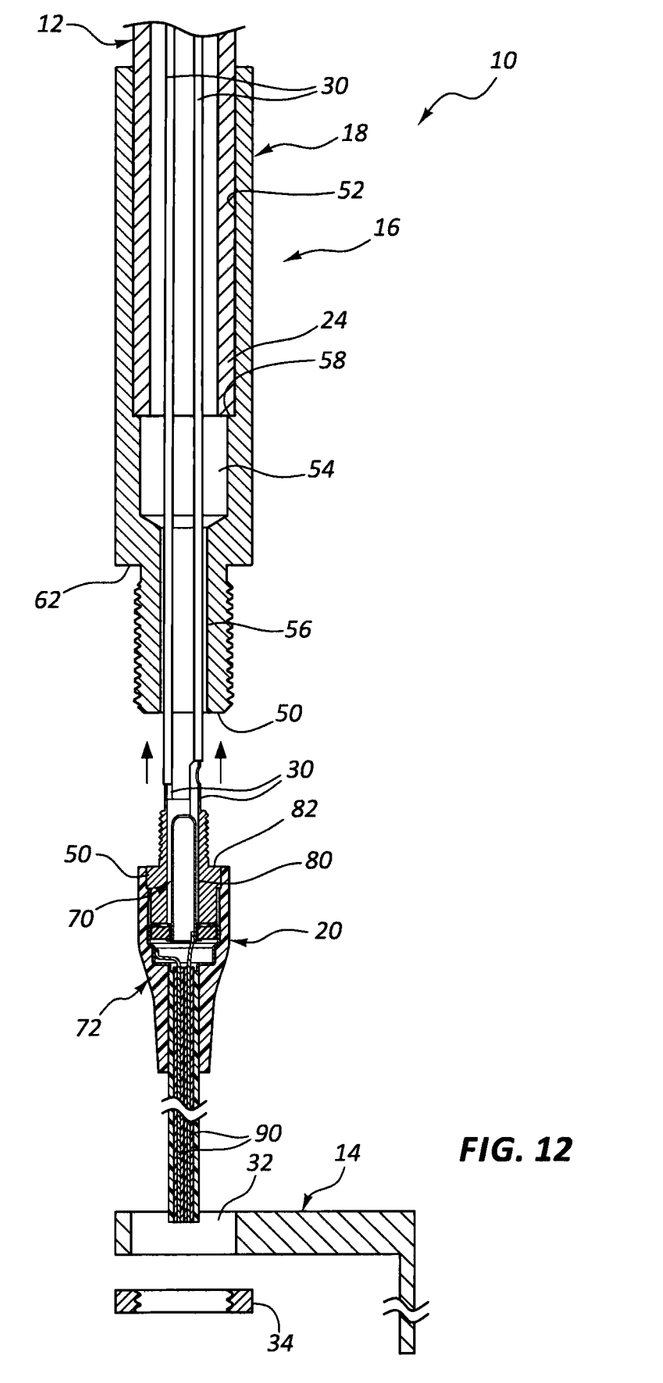
FIG. 12 is a partially assembled view of the warning whip assembly of FIG. 11.
Figure 13:
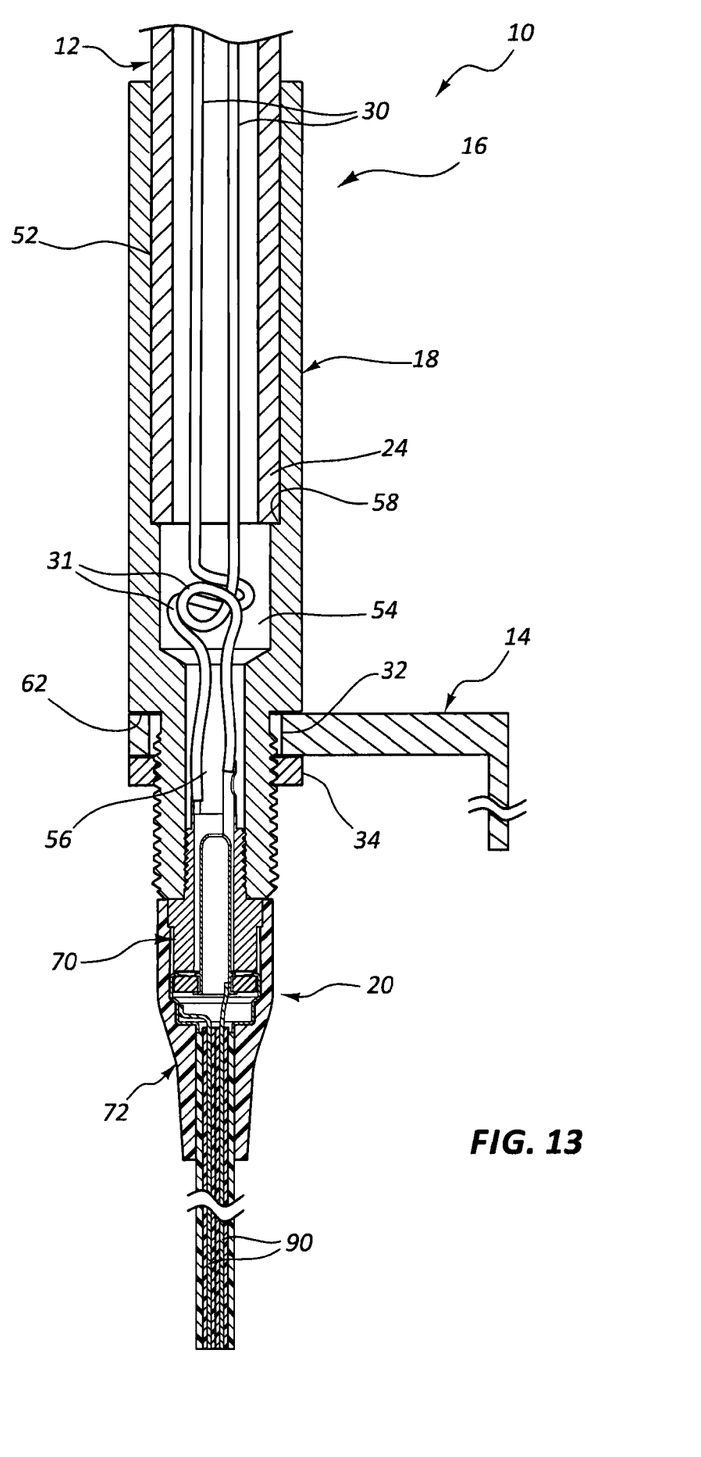
FIG. 13 is an assembled view of the warning whip assembly of FIG. 11.

Referring now to FIGS. 11-13, an example method of assembling the whip connect system 16 with other features of a warning whip assembly 10 is shown and described. FIG. 11 shows the warning whip assembly 10 including a whip 12, a mounting bracket 14, and a whip connect system 16. The whip 12 includes first and second ends 22, 24, a wire channel 26, a light 28, and wiring 30. The wiring 30 extends through the wire channel 26 from the light 28, which is positioned at the first end 22. The second end 24 is arranged for insertion into the whip portion 52 of cavity 48 of the base 18. The wiring 30 extends from the second end 24 a distance sufficient to extend completely through the base 18 when the second end 24 of the whip 12 is inserted into the whip portion 52 of base 18 as shown in FIG. 12. The wiring 30 is connected to the wire connect point 74 of the female connector 70. The female connector 70 may be disconnected from the male connector 72 prior to assembly with base 20, or connected together as shown in FIG. 12.

After the wiring 30 is connected to the female connector 70, the female connector 70 is inserted into the connector portion 56 of the cavity 48 as shown in FIG. 13. Excess wiring 31 of wiring 30 collects in the wiring portion 54 of cavity 48. The wiring portion 54 provides a space for the excess wiring 31 to gather without having to be forced into the wire channel 26 of whip 12 or be constrained within the connector portion 56 of cavity 48. The extra space within base 18 provided by wiring portion 54 may reduce the chance of kinking or breaking wiring 30 or in some way damaging wiring 30 such that a short occurs.

The female connector 70 may be permanently connected to the base 18 by insertion into the connector portion 56. In some examples, a bonding agent such as adhesive is applied to at least one of the connector portion 56 or female connector 70 prior to inserting the female connector 70 into the connector portion 56. In other arrangements, the external threads 76 of the female connector 70 may provide a releasable connection of the female connector 70 to the base 18. Typically, inserting a female connector 70 into the connector portion 56 of cavity 48 provides a waterproof connection between the female connector 70 and base 18.

Connecting the male connector 72 to the female connector 70 after the female connector 70 is inserted in the connector portion 56 may provide a waterproof connection between the male connector 72 and the base 18. As described above, the distal end 92 of the overmold 88, or other portion of male connector 72 may contact the proximal end surface 50 of base 18, or other portion of base 18 to provide a waterproof (e.g., liquid-tight) interface therebetween. In other arrangements, merely connecting the male connector 72 to the female connector 70, regardless of contact between the male connector 72 and the base 18, may provide the whip connect system 16 as a waterproof arrangement that limits the chance of shorting the electrical connection between the whip connect system 16 and wiring 30.

The second end 24 of the whip 12 may be held in place in the whip portion 52 of cavity 48 using a bonding agent such as adhesive. The adhesive may collect within the internal threads or grooves 60 of the whip portion 52. The bonding agent may provide a permanent connection between the base 18 and whip 12. Other connection features are possible for securing the whip 12 to the base 18 including, for example, an interference fit, a threaded connection, heat welding or laser bonding.

The portion of base 18 with external threads 46 may be inserted through a mounting aperture 32 of mounting bracket 14, a shoulder 62 of base 18 may rest against the mounting bracket 14 adjacent to the mounting aperture 32. A nut 34 may threadably engage the external threads 46 to secure the base 18 against the mounting bracket 14, thereby securing the whip 12 to the mounting bracket 14 as shown in FIG. 13.

The hex portion 44 may be used for connection of a wrench to base 18 to apply a rotation force when connecting the base 18 to the mounting bracket 14. The base 18 may be mounted to the mounting bracket 14 prior to assembling the whip 12 with the base 18, or assembling the whip 12 with the connector assembly 20.

The combined whip 12 with whip connect system 16 may be mounted to mounting bracket 14. The mounting bracket 14 may be mounted to a vehicle such as, for example, an ATV, motorcycle, pick-up truck, or service vehicle.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the present systems and methods and their practical applications, to thereby enable others skilled in the art to best utilize the present systems and methods and various embodiments with various modifications as may be suited to the particular use contemplated.

Unless otherwise noted, the terms "a" or "an," as used in the specification and claims, are to be construed as meaning "at least one of." In addition, for ease of use, the words "including" and "having," as used in the specification and claims, are interchangeable with and have the same meaning as the word "comprising."

What is claimed is:

1. A warning whip assembly, comprising:
    an elongate whip having first and second ends;
    a light mounted to the first end of the warning whip;
    wiring extending from the light to the second end of the warning whip;
    a base connected to the second end of the warning whip;
    an electrical connector assembly having a first connector portion connected to the base with a waterproof connection, the wiring being connected to the first connector portion, and a second connector portion releasably connected to the first connector portion.

2. The warning whip assembly of claim 1, wherein the base includes a stepped cavity having a first portion sized to receive the warning whip and a second portion sized to receive the first connector portion.

3. The warning whip assembly of claim 1, wherein the base includes a plurality of internal grooves, and the first connector portion is retained in the base using a bonding agent that fills the plurality of internal grooves.

4. The warning whip assembly of claim 2, wherein the stepped cavity comprises a third portion sized to receive excess portions of the wiring.

5. The warning whip assembly of claim 1, wherein the base comprises a hexagonal shaped portion on an outer surface thereof at a first end of the base, and a plurality of threads on the outer surface at a second end of the base.

6. The warning whip assembly of claim 1, wherein the first connector portion comprises a female RCA connector and the second connector portion comprises a male RCA connector.

7. The warning whip assembly of claim 1, wherein an interface between the base and second connector portion is waterproof.

8. A warning whip component, comprising:
    a base having at least first and second cavity portions, the first cavity portion open at a first end of the base and sized to receive a proximal end of a whip, the second cavity portion open at a second end of the base;
    an electrical connector assembly, comprising:
        a female connector inserted into the first cavity portion and having a waterproof connection with the base, the female connector being configured to connect to wiring extending through the whip;
        a male connector having a waterproof construction and being releasably connected to the female connector.

9. The warning whip component of claim 8, wherein the first and second cavity portions have a different internal diameter.

10. The warning whip component of claim 8, wherein the first cavity portion includes a wiring space positioned between the female connector and the first cavity portion, the wiring space being configured to house at least some of the wiring.

11. The warning whip component of claim 8, wherein the second cavity portion includes a plurality of grooves formed therein, the plurality of grooves being receptive of a bonding agent used to connect the female connector to the base.

12. The warning whip component of claim 8, wherein the female connector comprises a female RCA connector, and the male connector comprises a male RCA connector.

13. The warning whip component of claim 12, wherein the male connector comprises at least first and second wires connected to the male RCA connector.

14. The warning whip component of claim 13, wherein the male connector comprises an overmold encapsulating a connection point between the at least first and second wires and the male RCA connector.

15. The warning whip component of claim 8, wherein the base has a hexagonal construction on an outer surface at a first end thereof, and a plurality of threads on the outer surface at a second end thereof.

16. A method of assembling a warning whip component, comprising:
    providing a base having at least first and second cavity portions arranged axially within the base, the first cavity portion being configured to receive an elongate whip, and an electrical connector assembly comprising a female connector and a male connector;
    connecting wiring to the female connector, the wiring extending through the whip;
    inserting the female connector into the second cavity portion with excess wiring collected in the second cavity portion between the female connector and the first cavity portion;
    releasably connecting the male connector to the female connector.

17. The method of claim 16, wherein the female connector is connected to the base with a waterproof connection.

18. The method of claim 16, wherein the second cavity portion includes a wiring space defined between the first cavity portion and the female connector when inserted into the second cavity portion, the wiring space receiving the excess wiring.

19. The method of claim 16, wherein the male connector comprises a waterproof construction, further comprising providing a waterproof connection between the base and the male connector.

20. The method of claim 19, further comprising providing a plurality of grooves in the second cavity portion, and positioning a bonding agent between the female connector and the base to permanently fix the female connector to the base.

* * * * *